United States Patent
Douglas

(10) Patent No.: US 9,810,462 B2
(45) Date of Patent: Nov. 7, 2017

(54) DEHUMIDIFICATION USING INTERMITTENT VENTILATION

(71) Applicant: Lennox Industries Inc., Richardson, TX (US)

(72) Inventor: Jonathan Douglas, Lewisville, TX (US)

(73) Assignee: Lennox Industries Inc., Richardson, TX (US)

( * ) Notice: Subject to any disclaimer, the term of this patent is extended or adjusted under 35 U.S.C. 154(b) by 1035 days.

(21) Appl. No.: 14/057,958

(22) Filed: Oct. 18, 2013

(65) Prior Publication Data

US 2014/0041401 A1 Feb. 13, 2014

Related U.S. Application Data

(63) Continuation-in-part of application No. 13/333,727, filed on Dec. 21, 2011, now abandoned.

(51) Int. Cl.
| | |
|---|---|
| F25D 17/06 | (2006.01) |
| F24F 7/06 | (2006.01) |
| F24F 7/00 | (2006.01) |
| F25B 43/00 | (2006.01) |
| F24F 11/00 | (2006.01) |
| F24F 3/044 | (2006.01) |

(52) U.S. Cl.
CPC .............. *F25B 43/00* (2013.01); *F24F 3/044* (2013.01); *F24F 11/0001* (2013.01); *F24F 11/001* (2013.01); *F24F 2011/0038* (2013.01); *F24F 2011/0042* (2013.01); *Y02B 30/767* (2013.01); *Y10T 29/49826* (2015.01)

(58) Field of Classification Search
USPC ..................... 62/89; 454/229, 256
See application file for complete search history.

(56) References Cited

U.S. PATENT DOCUMENTS

| | | | | |
|---|---|---|---|---|
| 4,217,243 A | * | 8/1980 | Christie | B01J 21/20 208/164 |
| 4,271,898 A | * | 6/1981 | Freeman | G05D 23/275 165/250 |
| 4,478,048 A | * | 10/1984 | Dills | F24F 1/027 165/223 |
| 4,534,181 A | * | 8/1985 | Brown | F24F 5/001 62/180 |
| 4,586,893 A | | 5/1986 | Somerville et al. | |
| 5,180,102 A | * | 1/1993 | Gilbert | F24F 11/053 165/212 |
| 5,447,037 A | * | 9/1995 | Bishop | F24F 3/044 165/251 |
| 5,555,195 A | * | 9/1996 | Jensen | F24F 11/0086 165/100 |

(Continued)

OTHER PUBLICATIONS

Non-Final Office Action received in U.S. Appl. No. 13/333,727, dated Apr. 11, 2014, 18 pages.

*Primary Examiner* — Henry Crenshaw
(74) *Attorney, Agent, or Firm* — Hubbard Johnston, PLLC

(57) ABSTRACT

Systems and methods for dehumidifying and conditioning air for a commercial building are presented. In one instance, a system involves ventilating a building at a rate higher than the required outdoor airflow rate in order to compensate for the fan being turned off when the compressor is off. Other systems and methods are presented.

11 Claims, 8 Drawing Sheets

(56) References Cited

U.S. PATENT DOCUMENTS

| | | | | |
|---|---|---|---|---|
| 5,559,407 | A * | 9/1996 | Dudley | F04D 27/004 318/400.08 |
| 5,597,354 | A * | 1/1997 | Janu | F24F 11/0009 454/229 |
| 5,629,481 | A * | 5/1997 | Sultan | G01F 1/6888 73/204.16 |
| 5,769,315 | A | 6/1998 | Drees | |
| 5,791,408 | A | 8/1998 | Seem | |
| 5,971,067 | A | 10/1999 | Rayburn et al. | |
| 6,047,557 | A * | 4/2000 | Pham | A47F 3/04 236/1 EA |
| 6,082,128 | A * | 7/2000 | Lake | B60H 1/00392 62/324.6 |
| 6,126,540 | A | 10/2000 | Janu et al. | |
| 7,600,388 | B2 * | 10/2009 | Vestal | B01D 46/0086 55/DIG. 34 |
| 2004/0244392 | A1 * | 12/2004 | Gilch | B60H 1/00792 62/180 |
| 2005/0224591 | A1 * | 10/2005 | Wolfson | F24F 11/0001 236/49.3 |
| 2006/0117769 | A1 * | 6/2006 | Helt | F24F 11/0001 62/161 |
| 2006/0150644 | A1 | 7/2006 | Wruck | |
| 2006/0174560 | A1 | 8/2006 | Levine et al. | |
| 2007/0218828 | A1 * | 9/2007 | Baik | F24F 13/075 454/256 |
| 2007/0261422 | A1 * | 11/2007 | Crawford | F24F 11/0008 62/176.1 |
| 2009/0005912 | A1 | 1/2009 | Srivastava et al. | |
| 2009/0205354 | A1 * | 8/2009 | Brown | F24F 3/1405 62/324.5 |
| 2009/0223233 | A1 * | 9/2009 | Taras | F24F 3/153 62/93 |
| 2011/0146651 | A1 | 6/2011 | Puranen et al. | |

* cited by examiner

US 9,810,462 B2

DEHUMIDIFICATION USING INTERMITTENT VENTILATION

CROSS-REFERENCE TO RELATED APPLICATIONS

This application is a continuation-in-part of and claims priority to U.S. patent application Ser. No. 13/333,727, filed Dec. 21, 2011, entitled, "HVAC SYSTEM, A CONTROLLER THEREFOR AND A METHOD OF MEASURING AND MANAGING VENTILATION AIRFLOW OF AN HVAC SYSTEM," which is incorporated herein for all purposes.

TECHNICAL FIELD

This application is directed, in general, to heating, ventilating and air conditioning (HVAC) systems, and more specifically, to dehumidification using intermittent ventilation.

BACKGROUND

Heating, ventilating, and air conditioning or cooling (HVAC) systems can be used to regulate the environment within an enclosed space. Typically, an air blower is used to pull air (i.e., return air) from the enclosed space into the HVAC system through ducts and push the air back into the enclosed space through additional ducts after conditioning the air (e.g., heating, cooling or dehumidifying the air). Unless otherwise indicated, as used throughout this document, "or" does not require mutual exclusivity. Various types of HVAC systems may be used to provide conditioned air for enclosed spaces.

For example, some HVAC units are located on the rooftop of a commercial building. These so-called rooftop units, or RTUs, typically include one or more blowers and heat exchangers to heat or cool the building, and baffles to control the flow of air within the RTU. Some RTUs also include an air-side economizer that allows selectively providing fresh outside air (i.e., ventilation or ventilating air) to the RTU or to recirculate exhaust air from the building back through the RTU to be cooled or heated again.

At least one type of an economizer includes two damper assemblies driven by a common actuator. The damper blades are linked such that when the outdoor damper is open, the return air damper is closed. When a building is occupied, the outdoor damper of the economizer is typically opened a small amount (e.g., ten to twenty five percent) to allow fresh air into the building to meet ventilation requirements. When the outdoor air is colder than the return air and cooling is needed, the outdoor damper is typically opened to a hundred percent to allow the cooler outdoor air to enter the building. These two functions of an economizer are often referred to as a ventilation mode and a free cooling mode, respectively.

BRIEF DESCRIPTION

Illustrative embodiments of the present invention are described in detail below with reference to the attached drawing figures, which are incorporated by reference herein and wherein.

DETAILED DESCRIPTION

Figure 1:
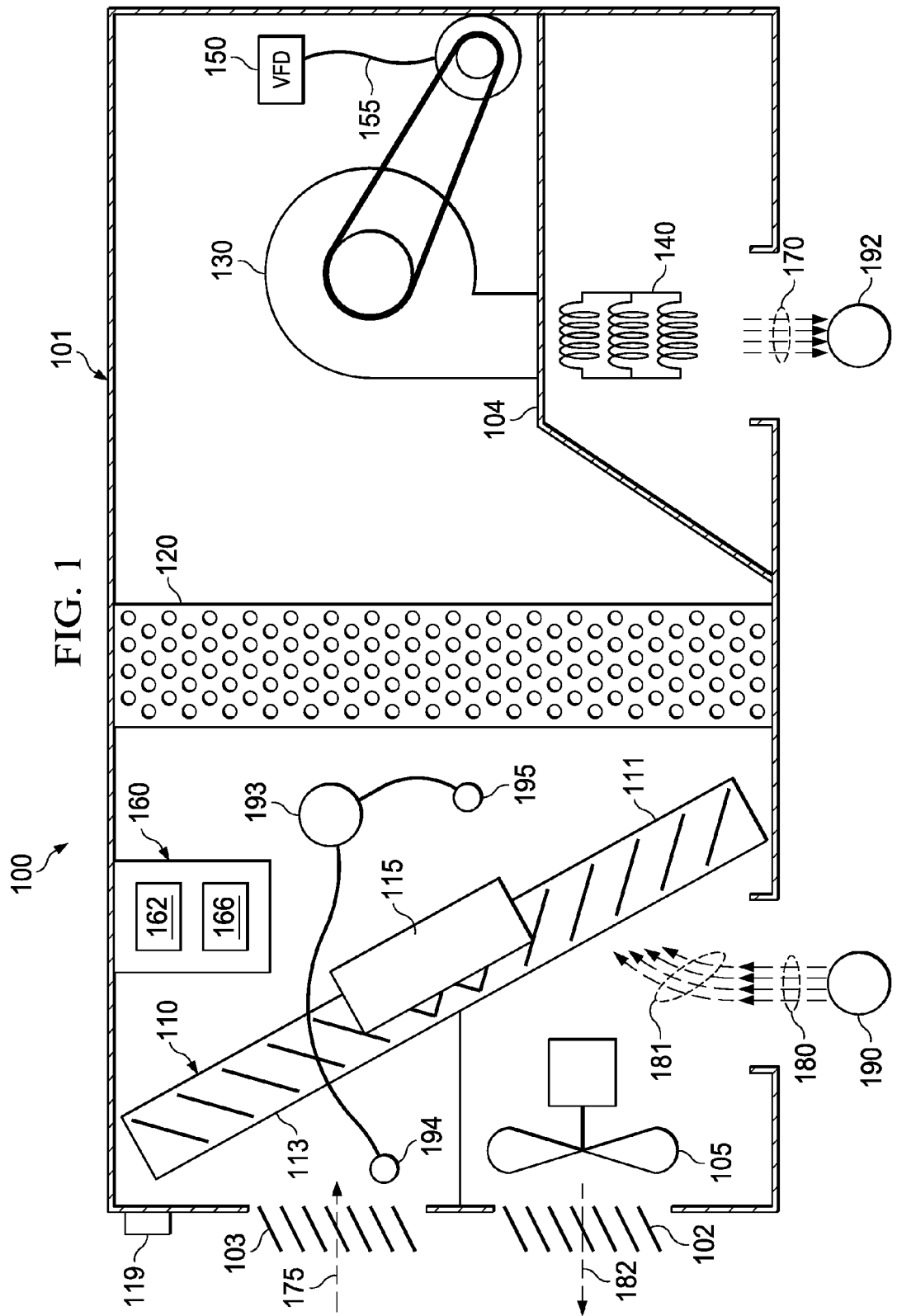
FIG. 1 illustrates a block diagram of an illustrative embodiment of an HVAC system constructed according to the principles of the disclosure.

In the following detailed description of the preferred embodiments, reference is made to the accompanying drawings that form a part hereof, and in which is shown, by way of illustration, specific embodiments in which the invention may be practiced. These illustrative embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Knowing the ventilation airflow rate (i.e., airflow rate through the outdoor damper of an economizer) during the various operating modes of an economizer, such as the ventilation mode and the free cooling mode, is advantageous. When in the ventilation mode, the ventilation airflow rate provides verification that ventilation as required is being provided. If the ventilation airflow rate is too high, then energy may be wasted due to over ventilation. In a free cooling mode, knowing the ventilation airflow rate provides an indication of the energy savings provided by the economizer. Thus, determining the ventilation airflow of an HVAC system is often desirable to verify that the system is providing the desired ventilation.

This disclosure includes a scheme for determining the ventilation airflow rate of an HVAC system employing feedback data of the operating HVAC system and the relationship of that feedback data to economizer ventilation data for the HVAC system. In one illustrative embodiment, a controller is disclosed that calculates the ventilation airflow rate employing the feedback data and the economizer ventilation data. The economizer ventilation data is developed from measured data obtained during manufacturing or engineering of the HVAC system. In one illustrative embodiment, the type of economizer ventilation data that is employed to calculate the ventilation airflow rate varies based on economizer damper position.

As disclosed in an illustrative embodiment herein, the feedback data employed to determine the ventilation airflow rate includes the economizer damper position and the pressure drop across the outdoor dampers of the economizer. In some illustrative embodiments, a supply airflow rate is also employed. Employing the supply airflow rate provide an enhancement that can increase the accuracy when the outdoor damper is 50% open or greater. Additionally, employing the supply airflow rate can increase the response time of control. Additionally, an outside air temperature and an elevation of the installed HVAC system can be employed. The economizer damper position can be determined from an actuator of the economizer. In one illustrative embodiment, position information from an actuator of the economizer is employed to determine and control the position of the damper blades of the economizer. Employing the position information from the actuator that moves the damper blades provides real-time data for accurately calculating outside airflow into the HVAC system.

In addition to determining the real-time ventilation airflow rate, a controller is disclosed that monitors and directs the economizer's dampers to achieve a user specified ventilation rate. The controller can also be configured to perform diagnostics and generate alarms to warn a user when the actual ventilation rate is above or below a desired value. In some illustrative embodiments, a controller or operating schemes are disclosed that compensate for hysteresis in the operation of an economizer actuator, automatically calibrate an actuator offset in the field, select economizer ventilation data based on the opening percentage of an economizer's outdoor dampers and compensate for temperature and elevation.

In one illustrative embodiment, a controller and operating schemes are also disclosed that employ the ventilation airflow rate that has been calculated to determine a prorated ventilation rate. The prorated ventilation rate can then be used to obtain a ventilation rate over a desired amount of time while reducing the run-time on the indoor fan or blower of the HVAC system. In one illustrative embodiment described herein, the HVAC controller monitors the fraction of time the compressor ran during the previous hour. Based on that runtime, the controller calculates a new higher ventilation rate which, when ventilating during only the compressor on time, provides the same amount of ventilation over an hour period as the original ventilation rate would provide with continuous operation. This enables the indoor fan to be turned off when the compressor is not running while still providing the required amount of ventilation. Turning the fan off when the compressor is not running will dramatically improve the ability to dehumidify. When the fan is running without the compressor on, water collected on the cooling coil evaporates, negating the dehumidification done when the compressor was running. Thus, disclosed herein are illustrative embodiments of dynamically adjusting a ventilation rate to allow fan off time.

FIG. 1 illustrates a block diagram of an illustrative embodiment of an HVAC system 100 that includes an enclosure 101 (e.g., a cabinet) with openings for exhaust air, ventilation air, return air and supply air. The enclosure 101 includes exhaust vents 102 and ventilation vents 103 at the corresponding exhaust air and ventilation air openings. Within the enclosure 101, the system 100 includes an exhaust fan 105, economizer 110, a cooling element 120, an indoor fan or blower 130, and a heating element 140. Additionally, the system 100 includes a fan controller 150 and a HVAC controller 160. The fan controller 150 is coupled to the blower 130 via a cable 155. The cable 155 is a conventional cable used with HVAC systems, but other coupling devices or techniques, e.g., wireless, might be used. The HVAC controller 160 can be connected (not illustrated) to various components of the system 100, including a thermostat 119 for determining outside air temperature, via wireless or hardwired connections for communicating data. Conventional cabling or wireless communications systems may be employed. Also included within the enclosure 101 is a partition 104 that supports the blower 130 and provides a separate heating section.

The system 100 is a rooftop unit (RTU). One skilled in the art will understand that the system 100 can include other partitions or components that are typically included within an HVAC system such as an RTU. While the illustrative embodiment of the system 100 is discussed in the context of a RTU, the scope of the disclosure includes other HVAC applications that are not roof-top mounted.

The blower 130 operates to force an air stream 170 into a structure, such as a building, being conditioned via an unreferenced supply duct. A return airstream 180 from the building enters the system 100 at an unreferenced return duct.

A first portion 181 of the air stream 180 re-circulates through the economizer 110 and joins the air stream 170 to provide supply air to the building. A second portion of the air stream 180 is air stream 182 that is removed from the system 100 via the exhaust fan 105.

The economizer 110 operates to vent a portion of the return air 180 and replace the vented portion with the air stream 175. Thus air quality characteristics such as $CO_2$ concentration and humidity may be maintained within defined limits within the building being conditioned. The economizer 110 includes an indoor damper 111, an outdoor damper 113 and an actuator 115 that drives (opens and closes) the indoor and outdoor dampers 111, 113 (i.e., the blades of the indoor and outdoor dampers 111, 113). Though the economizer 110 includes two damper assemblies, one skilled in the art will understand that the concepts of the disclosure also apply to those economizers or devices having just a single damper assembly, an outdoor damper assembly.

The controller 160 includes an interface 162 and a ventilation director 166. The ventilation director 166 may be implemented on a processor or a memory of the controller 160. The interface 162 receives feedback data from sensors and components of the system 100 and transmits control signals thereto. As such, the controller 160 may receive feedback data from, for example, the exhaust fan 105, the blower 130 or the fan controller 150, the economizer 110 and the thermostat 119, and transmit control signals thereto if applicable. One skilled in the art will understand that the location of the controller 160 can vary with respect to the HVAC system 100.

The interface 162 may be a conventional interface that employs a known protocol for communicating (i.e., transmitting and receiving) data. The interface 162 may be configured to receive both analog and digital data. The data may be received over wired, wireless or both types of communication mediums. In some illustrative embodiments, a communications bus may be employed to couple at least some of the various operating units to the interface 162.

Though not illustrated, the interface 162 includes input terminals for receiving feedback data.

The feedback data received by the interface 162 includes data that corresponds to a pressure drop across the outdoor damper 113 and damper position of the economizer 110. In some illustrative embodiments, the feedback data also includes the supply airflow rate. Various sensors of the system 100 are used to provide this feedback data to the HVAC controller 160 via the interface 162. In some illustrative embodiments, a return pressure sensor 190 is positioned in the return air opening to provide a return static pressure. The return pressure sensor 190 measures the static pressure difference between the return duct and air outside of the HVAC system 100. In one illustrative embodiment, a supply pressure sensor 192 is also provided in the supply air opening to indicate a supply pressure to the HVAC controller 160. The supply pressure sensor 192 measures the static pressure difference between the return duct and the supply duct. Pressure sensor 193 is used to provide the pressure drop across outdoor damper 113 of the economizer 110. The pressure sensor 193 is a pressure transducer that determines the static pressure difference across the outdoor damper 113. The pressure sensor 193 includes a first input 194 and a second input 195 for receiving the pressure on each side of the outdoor damper 113. The pressure sensors discussed herein can be conventional pressure sensors typically used in HVAC systems.

The HVAC controller 160 is configured to determine supply airflow according to conventional means. For example, in one illustrative embodiment, the HVAC controller 160 is configured to calculate the supply airflow rate based on a set of blower curves, fan power and fan speed.

Economizer damper position is provided to the HVAC controller 160 via the actuator 115. The actuator 115 is configured to rotate or move the indoor and outdoor dampers 111, 113, of the economizer 110 in response to a received signal, such as control signals from the HVAC controller 160 (i.e., the ventilation director 166). The actuator 115 is a conventional actuator, such as an electrical-mechanical device, that provides a signal that corresponds to the economizer damper position (i.e., blade angle of the outdoor damper 113 of the economizer 110). The signal is an electrical signal that is received by the ventilation director 166 which is configured to determine the relative angle of the outdoor damper 113 based on the signal from the actuator 115. A lookup table or chart may be used by the processor 117 to determine a relative blade angle with respect to an electrical signal received from the actuator 115. The angle can be based on (i.e., relative to) the ventilation opening of the HVAC system 100. In some illustrative embodiments, the economizer damper position can be determined via other means. For example, an accelerometer coupled to a blade (or multiple accelerometers to multiple blades) of the outdoor damper 113 may be used to determine the economizer damper position. The outdoor damper 113 is opened at 100 percent when the blades thereof are positioned to provide maximum airflow of ventilation air 175 into the system 100 through the ventilation opening. In FIG. 1, the blades of the outdoor damper 113 would be perpendicular to the ventilation opening or the frame surrounding the ventilation opening when opened at 100 percent. In the illustrated embodiment, the blades of the outdoor damper 113 would be parallel to the ventilation opening when opened at zero percent.

Figure 3:
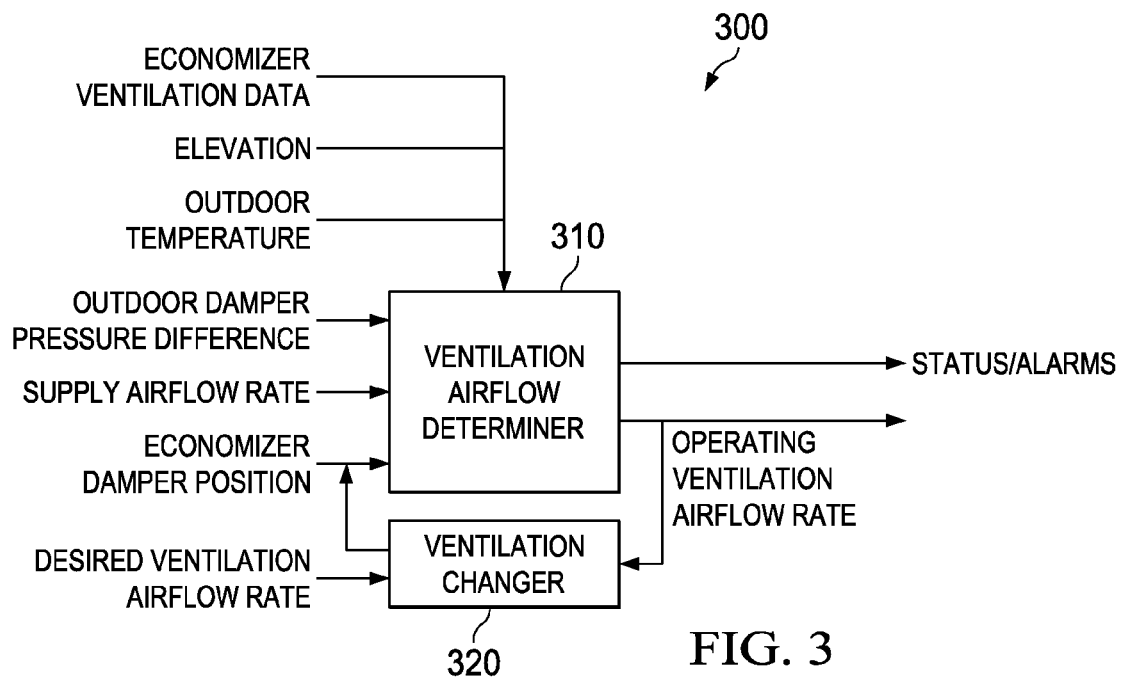
FIG. 3 illustrates a block diagram of an illustrative embodiment of ventilation director constructed according to the principles of the disclosure.

The ventilation director 166 is configured to determine an operating ventilation airflow rate of the HVAC system 100 based on the static pressure difference across the outdoor dampers 113, the economizer damper position and economizer ventilation data. In some illustrative embodiments, the ventilation director 166 also employs the supply airflow rate to calculate the operating ventilation airflow rate. In one illustrative embodiment, using the supply airflow rate for the calculation is based on the economizer damper position being above 50 percent. In one illustrative embodiment, the economizer ventilation data is developed during manufacturing or engineering of the system 100 or similar type of HVAC systems. During development, a ventilation airflow rate is measured in, for example, a laboratory, at a variety of operating conditions. Various sensors or other type of measuring devices are employed during the development to obtain the measured data for the various operating conditions. Economizer ventilation data is developed from the measured data and loaded into the HVAC controller 160, such as a memory thereof. During operation in the field, the HVAC controller 160 (e.g., the ventilation director 166) receives the feedback data and calculates the ventilation airflow rate employing the feedback data and the economizer ventilation data. FIG. 3 provides a more detailed illustrative embodiment of a ventilation director 166.

The ventilation director 166 is further configured to adjust a position of the economizer 110 based on the economizer damper position and a desired ventilation airflow rate. The desired ventilation airflow rate can be preprogrammed into a memory of the HVAC controller 160 during manufacturing. In some illustrative embodiments, the desired ventilation airflow rate is entered into the HVAC controller 160 in the field during, for example, installation, a maintenance visit or a service visit. The ventilation director 166 generates a signal that directs the actuator 115 to adjust a position of the blades of the economizer 110 based on the desired ventilation airflow rate. In some illustrative embodiments, this signal represents a difference between the operating ventilation airflow rate and the desired ventilation airflow rate.

Figure 2:
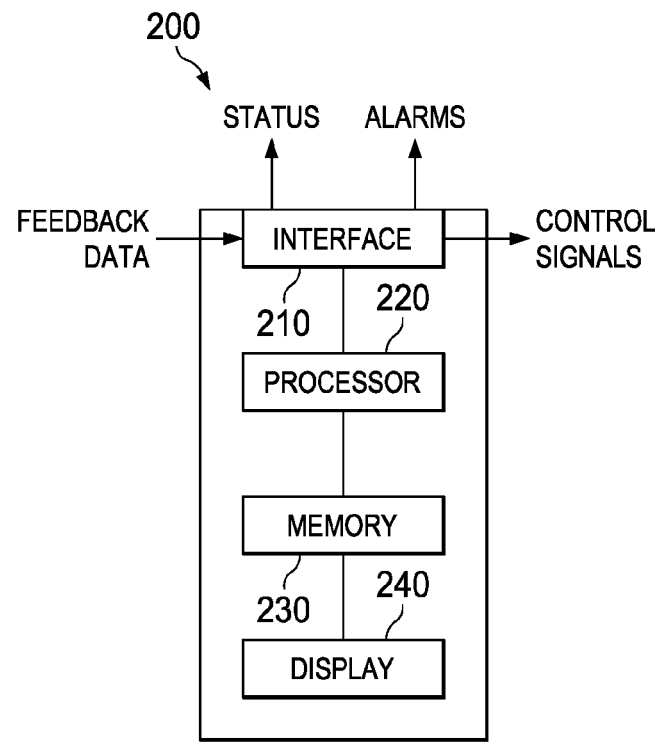
FIG. 2 illustrates a block diagram of an illustrative embodiment of a controller constructed according to the principles of the disclosure.

FIG. 2 illustrates a block diagram of an illustrative embodiment of a controller 200 that is configured to direct the operation of or at least part of the operation of an HVAC system, such as HVAC system 100. As such, the controller 200 is configured to generate control signals that are transmitted to the various components to direct the operation thereof. The controller 200 may generate the control signals in response to feedback data that is received from the various sensors or components of the HVAC system. The controller 200 includes an interface 210 that is configured to receive and transmit the feedback data and control signals. The interface 210 may be a conventional interface that is used to communicate (i.e., receive and transmit) data for a controller, such as a microcontroller.

The interface 210 may include a designated input terminal or input terminals that are configured to receive feedback data from a particular component. The controller 200 also includes a processor 220 and a memory 230. The memory 230 may be a conventional memory typically located within a controller, such as a microcontroller, that is constructed to store data and computer programs. The memory 230 may store operating instructions to direct the operation of the processor 220 when initiated thereby. The operating instructions may correspond to algorithms that provide the functionality of the operating schemes disclosed herein. For example, the operating instructions may correspond to the algorithm or algorithms that implement the method illustrated in FIG. 5. The processor 220 may be a conventional processor such as a microprocessor. The controller 200 also includes a display 240 for visually providing information to a user. The interface 210, processor 220 memory 230 and display 240 may be coupled together via conventional means to communicate information. The controller 200 may also include additional components typically included within a controller for a HVAC unit, such as a power supply or power port.

The controller 200 is configured to receive feedback data from the HVAC system including feedback data that corresponds to, for example, a pressure difference across an outdoor damper of an economizer, supply airflow rate and economizer damper position of the HVAC system. Additionally, the controller 200 is configured to determine an operating ventilation airflow rate of the HVAC system based on operating data, such as, the outdoor damper pressure difference, the supply airflow rate and the economizer damper position during operation. In some illustrative embodiments, the controller 200 also receives and employs condition data, such as, the outside ambient temperature and the elevation at the HVAC system, when calculating the ventilation airflow rate. The controller 200 calculates the ventilation airflow rate employing the feedback data, that includes the operating and condition data of the HVAC system, with the appropriate corresponding economizer data. In one illustrative embodiment, the economizer data is predetermined economizer ventilation data that is specific for particular HVAC systems or types of HVAC systems.

The controller 200 is further configured to adjust a position of an economizer of the HVAC system based on the economizer damper position and a desired ventilation airflow rate. In one illustrative embodiment, the controller 200 generates and transmits control signals to an actuator of the economizer to adjust the economizer damper position. In addition to the operation schemes disclosed herein, the controller 200 can be configured to provide control functionality beyond the scope of the present disclosure.

The controller 200 may also be configured to generate alarms and status based on the ventilation airflow rate. In some illustrative embodiments, the controller 200 is configured to employ the ventilation airflow rate to determine a prorated ventilation airflow rate and direct the operation of an HVAC system based thereon.

Referring to FIG. 3 an illustrative embodiment of a ventilation director 300 is presented. The ventilation director 300 may be embodied as a series of operation instructions that direct the operation of a processor when initiated thereby. In one illustrative embodiment, the ventilation director 300 is implemented in at least a portion of a memory of an HVAC controller, such as a non-transistory computer readable medium of the HVAC controller. The ventilation director 300 includes a ventilation airflow determiner 310 and a ventilation changer 320.

The ventilation airflow determiner 310 is configured to calculate the operating ventilation airflow rate based on feedback data and economizer ventilation data. The economizer ventilation data is measured data that was obtained under various operating conditions in a laboratory environment. In one illustrative embodiment, the economizer ventilation data is specific for a particular type of HVAC system.

The ventilation airflow determiner 310 receives feedback data, such as operating data and condition data, from the HVAC system. The feedback data includes the outdoor damper pressure difference, the supply airflow rate and the economizer damper position. In one illustrative embodiment, the outdoor damper pressure difference is received from a pressure transducer, such as pressure sensor 193, that determines the pressure difference. In some illustrative embodiments the return duct pressure drop is employed for the outdoor damper pressure difference. The return duct pressure drop may be determined via conventional means and provided to the ventilation airflow determiner 310 for the outdoor damper pressure difference.

In typical applications, the return static pressure is within a range of a tenth of an inch to a half of an inch (0.1 inch to 0.5 inch) of water column. In some illustrative embodiments, the ventilation airflow rate ranges from 10 percent to 30 percent of the design airflow rate for the HVAC system. This 30 percent ventilation airflow rate of the designed system airflow rate can usually be obtained with a damper opening of 35 percent.

The elevation of the HVAC system can be stored in a memory of an HVAC controller. In one illustrative embodiment, the elevation is stored in the ventilation airflow determiner 310. The elevation is a parameter that is typically entered by a user during initial setup. The elevation may be entered, for example, during installation or a service visit. The outdoor temperature can be provided by a thermometer associated with the HVAC system. As discussed with respect to FIG. 1, the supply airflow rate can be provided by conventional means the economizer damper position can be provided from feedback data of an economizer actuator.

The ventilation airflow determiner 310 is configured to calculate the ventilation airflow rate employing a combination of equations, feedback data and the economizer ventilation data. In some illustrative embodiments, the economizer ventilation data is stored in look-up tables.

The ventilation airflow determiner 310 calculates the ventilation airflow rate differently according to the current economizer damper position. When the current economizer damper position is 50 percent or less, the ventilation airflow determiner 310 employs Equation 1 to calculate the ventilation airflow rate.

$$\text{Ventilation Airflow Rate} = 1096 * CA(\Delta P/\beta)^{1/2} \qquad \text{(Equation 1)}$$

In Equation 1, $\Delta P$ is the outdoor damper pressure difference and CA is the damper effective open area expressed in squared feet (i.e., $ft^2$). The value 1096 is a conversion constant that is used to make the measurement units more useable. The effective open area CA is calculated employing a flow coefficient table of the economizer ventilation data established for the HVAC system. Flow coefficient data is a parameter developed from testing of HVAC systems that is a function of damper position and relates outdoor damper position to the effective open area CA. The ventilation airflow determiner 310 is configured to select the appropriate flow coefficient data from the economizer ventilation data based on the economizer damper position. For a current economizer damper position that is 50 percent or less, a first table of flow coefficient data is selected and employed. Table 1 is an example of a flow coefficient table that is selected for an economizer damper position less than or equal to 50 percent. The values in Table 1 are unique for a particular economizer damper assembly and are provided as an example. The flow coefficients for two HVAC models, Model A and Model B, are provided in Table 1. One skilled in the art will understand that flow coefficient tables for other particular HVAC systems can be developed and stored with a controller of the particular HVAC systems. In some illustrative embodiments, the ventilation airflow determiner 310 is configured to determine the effective air opening CA by interpolation of the data in a flow coefficient table such as Table 1.

TABLE 1

Flow Coefficients for Economizer Damper
Position Equal To or Less Than Fifty Percent

| % OPEN | CA MODEL A | CA MODEL B |
|---|---|---|
| 0 | 0.0 | 0.0 |
| 5 | 0.055736 | 0.04812 |
| 10 | 0.083934 | 0.095381 |
| 15 | 0.113264 | 0.125026 |
| 20 | 0.151411 | 0.166996 |
| 25 | 0.208313 | 0.219794 |
| 30 | 0.278474 | 0.289318 |
| 35 | 0.354823 | 0.390838 |
| 40 | 0.460648 | 0.538106 |
| 45 | 0.588303 | 0.718347 |
| 50 | 0.722145 | 0.942691 |

In Table 1, "% Open" represents the outdoor damper blade position relative to the frame of the HVAC system at the ventilation opening. In one illustrative embodiment, the % Open is calculated using an actuator feedback signal. The relationship between the % Open and the actuator feedback signal is typically dependent on the characteristics of the actuator and the design of the economizer. In one illustrative embodiment, the relationship between % Open and the actuator feedback signal is represented with Equation 2.

$$\% \text{ Open} = 100 \times (V_{feedback} - V_{offset})/8 \quad \text{(Equation 2)}$$

$V_{feedback}$ and $V_{offset}$ correspond to the type of actuator that is used. $V_{feedback}$ is the feedback voltage output by the actuator. $V_{offset}$ is a voltage value that corresponds to a fully closed economizer. In one illustrative embodiment, $V_{offset}$ is nominally two volts, $V_{feedback}$ is two volts when the damper is 0% open and $V_{feedback}$ is ten volts when 100% open. The number 8 in Equation 2 is a conversion constant that is specific to the type of actuator employed.

$V_{offset}$ may vary from part to part. For example, in one illustrative embodiment $V_{offset}$ can vary between 2.1 volts to 2.75 volts with a closed damper. As such, instead of using a fixed offset based on the actuator specification, in some illustrative embodiments a measured offset is used. To determine the measured offset, the actuator is commanded to go to its minimum position during calibration. After waiting the amount of time required to move to its minimum position, the ventilation airflow determiner 310 measures the feedback voltage. If the feedback voltage is within the normal variation of offset voltage, the current feedback is recorded as the offset voltage. If the feedback voltage is not within the normal variation of offset voltage, an error code is generated and the default offset is used.

Figure 4:
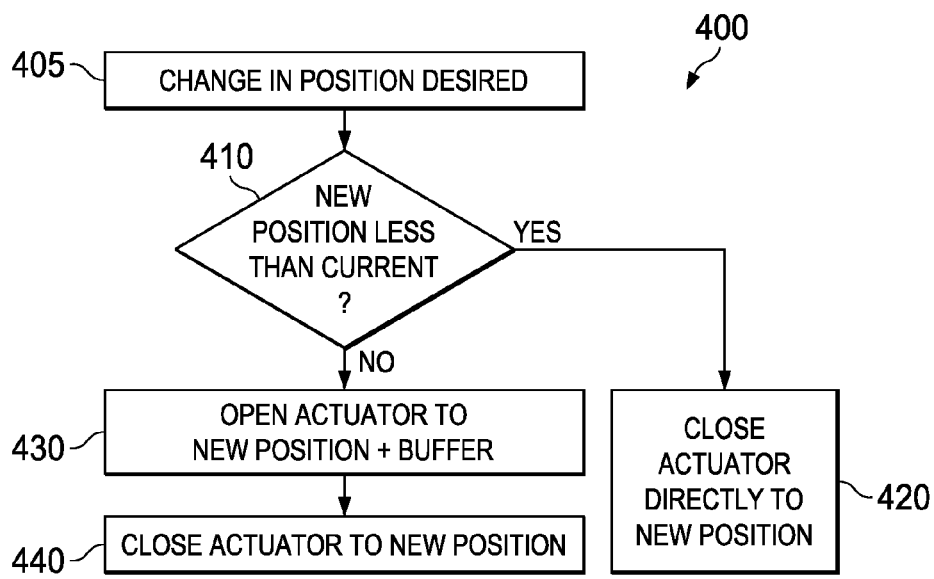
FIG. 4 illustrates a flow diagram of an illustrative embodiment of a method of repositioning the dampers of an economizer according to the principles of the disclosure and FIG. 5 illustrates a flow diagram of an illustrative embodiment of a method of measuring and managing ventilation airflow of a HVAC system carried out according to the principles of the disclosure.

During operation, hysteresis in the relationship between the actuator feedback signal and the actual position of the economizer damper blades can occur. As such, the ventilation director 300 (i.e., the ventilation airflow determiner 310 or the ventilation changer 320) can reposition the damper blades. The flow diagram of FIG. 4 illustrates an illustrative embodiment of such a method.

Returning to Equation 1, p is the density of air entering the outdoor damper. In one illustrative embodiment, the ventilation airflow determiner 310 calculates the air density p employing Equation 3.

$$P = 0.075((460+64)/(460+T_{OD}))(P_{atm}/14.696) \quad \text{(Equation 3)}$$

In Equation 3, $T_{OD}$ is the outdoor temperature in Fahrenheit and $P_{atm}$ is the atmospheric pressure calculated by Equation 4.

$$P_{atm} = 14.696 \times (1 - 6.876E - 6 \times ALT)^{5.25588} \quad \text{(Equation 4)}$$

In Equation 3, ideal gas relationships are being used to correct air density for temperature and pressure variations. 0.075 is a reference density of air at 64 F and 14.696 psia (sea level). The first term 460+64/46+T corrects the reference density for temperature (460 is used to convert the temperature to the absolute ranking scale). The term $P_{atm}/14.696$ corrects for atmospheric pressure. Thus, the density is calculated using $T_{OD}$ and $P_{atm}$ and ideal gas relationships. Equation 4 is a standard equation used by the national weather service to calculate atmospheric pressure as a function of elevation wherein the terms have been converted for US units.

In Equation 4, ALT is the elevation of the HVAC system in feet and is a user entered parameter. An elevation of 650 feet, which is approximately the median elevation, is entered as a default elevation. This can be entered during manufacturing of an HVAC system or when programming a controller of the HVAC system. Additionally, a default outdoor temperature of 70 degrees Fahrenheit may also be used. Calculating the air density based on elevation and temperature increase the accuracy of the ventilation measurement across wide temperatures and at high altitudes.

When the current economizer damper position is greater than 50 percent, the ventilation airflow determiner 310 employs a different flow coefficient table to calculate the ventilation airflow rate. For example, Table 2 represents a flow coefficient table for a particular type of HVAC system when the current economizer damper position is greater than 50 percent. In some illustrative embodiments, the ventilation airflow determiner 310 is configured to determine the percentage of outdoor air by interpolation of the data in a flow coefficient table such as Table 2. Once the percentage of outdoor air is known, the ventilation airflow determiner 310 multiplies the percentage of outdoor air by the total supply airflow to determine the ventilation airflow rate. As with Table 1, the flow coefficients for two different models of HVAC systems are provided as an example.

TABLE 2

Flow Coefficients for Economizer Damper
Positions Greater Than Fifty Percent

| % OPEN | % OD AIR MODEL A | % OD AIR MODEL B |
|---|---|---|
| 50 | 65.3 | 65.3 |
| 60 | 79 | 79 |
| 70 | 88.2 | 88.2 |
| 80 | 95.1 | 95.1 |
| 90 | 97 | 97 |
| 100 | 97 | 97 |

Thus, the ventilation airflow determiner 310 selects the appropriate flow coefficient table to employ based on the current economizer damper position and determines the operating ventilation airflow rate that is provided to the ventilation changer 320. The ventilation changer 320 receives the operating ventilation airflow rate and a desired ventilation airflow rate. Based on these received airflow rates, the ventilation changer 320 adjusts the economizer damper position to obtain the desired ventilation airflow rate. The desired ventilation airflow rate may be received via a user interface, such as a touch screen or keypad or Internet, associated with an HVAC controller or the ventilation director 300. In one illustrative embodiment, the desired ventilation airflow rate is stored and received from a memory, such as the memory of an HVAC controller. The various ventilation airflow rates may be provided to a user via a display of an HVAC controller.

The ventilation changer 320, therefore, uses the ventilation airflow rate determined above to automatically adjust the damper actuator position command delivered to the actuator to achieve a user specified ventilation rate. In some illustrative embodiments, the ventilation changer 320 is configured to minimize movement of the actuator. As such, concerns about reliability limitations of an economizer actuator are minimized. Accordingly, in some illustrative embodiments, a ventilation changer 320 is configured to change the damper position once per a designated time. In some illustrative embodiments, the ventilation changer 320 is configured to change the damper position only once in every 10 minutes. In other illustrative embodiments, the ventilation changer 320 is configured to change the damper position when the operating state of the fan system has changed. The basis for determining when to change the damper position and the designated time for changing the damper position are adjustable.

In some illustrative embodiments, designated events may be predetermined to use as a basis for determining when to change the damper position. For example, a change in supply air fan speed and a change in ventilation setpoint can be used to trigger a change in damper position. In one illustrative embodiment, the ventilation changer 320 is configured to continuously integrate the error between the actual ventilation rate and the desired rate when waiting to make a control move. In one illustrative embodiment, the ventilation changer 320, when determining it is time to make a control move, determines the next position of the damper blades of the outdoor damper with following procedure:

(1) Calculate an integral offset of the actuator where the integral offset=−1*Integrated Error/Integral Gain. If the absolute value of the integral offset is greater than the desired ventilation rate, then the integral offset is set equal to the integral offset multiplied by the desired ventilation rate divided by the absolute value of the integral offset. To prevent over opening or over closing the damper, a ventilation rate more than some limit, e.g., twice the normal ventilation rate may not be employed.

(2) Calculate the new ventilation target airflow using the following by adding the desired ventilation rate and the integral offset together.

(3) Calculate the current ventilation airflow rate using a procedure defined above with respect to the ventilation airflow determiner 310.

(4) Acquire the current outdoor damper pressure difference.

(5) Acquire the current supply airflow.

(6) Acquire the current economizer damper position.

(7) Calculate the new predicted damper pressure difference employing the following equation, Equation 5, wherein CurrentDP is the current economizer damper position, CurrentCFM is the current supply airflow and VentTarget is the ventilation target. For Equation 5, the ventilation changer 320 can employ the return duct static pressure difference as the pressure difference across the outdoor damper. Typically, the return duct pressure drop is proportional to the square of the airflow rate through the return duct. In this illustrative embodiment, the ventilation changer 320 assumes that the airflow through the return duct is equal to the supply airflow rate minus the ventilation airflow rate.

$$newDP = CurrentDP * ((CurrentCFM - VentTarget)/(CurrentCFM - CurrentVent))^2 \quad \text{(Equation 5)}$$

(8) Calculate the new CA employing Equation 6.

$$newCA = VentTarget/(newDP)^{0.5} \quad \text{(Equation 6)}$$

(9) Use the economizer ventilation data (such as Table 1) to determine the economizer damper position, i.e., the new damper position associated with the new CA, and determine the position difference between the new damper position and the current damper position. If the absolute value of the position difference is less than Deadband (i.e., less than the steps at which the actuator can move, such as 1.5% step), then set the new damper position as the new damper position. Otherwise, set the new damper position equal to the current position.

The ventilation director 300 (i.e, either the ventilation airflow determiner 310 or the ventilation changer 320 or a combination thereof) can also perform diagnostics, detect faults with the economizer and generate alarms. The alarms could be visually presented on a display of a controller or communicated to a monitor or monitoring service. An audible alarm may also be generated. The diagnostics can be used to warn a user of a fault which could cause an inaccurate measurement of ventilation airflow. An example of an alarm resulting from receiving feedback data from the economizer actuator includes Damper Stuck. Damper Stuck can be determined by comparing actuator feedback position to command position. During operation of the damper actuator, the feedback position of the damper is compared with the desired position. Once the actuator has stopped moving, if the feedback position in not within a prescribed tolerance of the desire position, the algorithm indicates a fault. The ventilation director 300, will continue to monitor the feedback position and automatically clear the fault should the feedback start to match the command.

In one illustrative embodiment, the ventilation director 300 is also configured to perform damper pressure sensor diagnostics. Based on normal operating data that can be stored in an HVAC controller, the ventilation director 300 can compare the outdoor damper pressure difference with the percent of damper opening and generate an alarm if the measured pressure is out of range compared to the stored operating data. An error can be recorded and an alarm generated based on the comparison.

The ventilation director 300 can also be configured to employ the ventilation airflow rate to determine the damper position necessary to deliver required ventilation only when the compressor is running. As such, humidity problems associated with a continuous fan can be reduced or eliminated and operation of the HVAC system can still comply with Indoor Air Quality standards established by governing bodies, such as the ASHRAE 62.1 standard. In one illustrative embodiment, the ventilation director 300 is configured to determine a prorated ventilation airflow rate and deliver the required ventilation as described below. An hour is used in the illustrative embodiment discussed below but other amounts of time may also be used in different embodiments.

(1) At the beginning of each hour: a. determine the fraction of compressor on time during the past hour (i.e., runfrac); b. calculate the required ventilation rate (when compressor is on using Equation 7 employing runfrac and the ventilation rate when the compressor is on continually ($Qvent_{CONT}$). The constant 1.2 in Equation 7 is a margin of safety which ensures the correct amount of ventilation is delivered even if the compressor runs 20% less than the previous hour.

$$Qvent_{CompOn}=1.2(Qvent_{CONT}/runfrac) \quad \text{(Equation 7)}$$

(2) When the compressor is on, set the ventilation controller setpoint to Qvent comp ON.

(3) When the compressor is off, set the ventilation setpoint to 0.

(4) Integrate the amount of ventilation airflow delivered over an hour. If the integrated amount exceeds Qvent cont*60 then set the ventilation setpoint=0.

Turning now to FIG. 4, illustrated is a flow diagram of an illustrative embodiment of a method 400 of repositioning the dampers of an economizer. In some illustrative embodiments, hysteresis results in the relationship between the actuator feedback signal and the actual position of the economizer damper blades. In some illustrative embodiments, the hysteresis can be significant enough to cause a ten percent error in the relationship between the actuator feedback and the damper blade position. The method 400 can be employed to correct this problem. In one illustrative embodiment, a ventilation airflow determiner is configured to perform the method 400. The method 400 represents an algorithm that can be implemented as a series of operating instructions.

The method 400 begins in a step 405 with a change in the position of the dampers being desired. In a decisional step 410, a determination is made if the new desired damper position is less than the current damper position. Thus, step 410 includes comparing the current damper position (e.g., the current percentage of opening) to the desired damper position (e.g., the desired percentage of opening). If the desired position is less than the current position, then the method continues to step 420 where the actuator is closed directly to the desired position. If the desired position is not less than (i.e., is greater) the current position, then the method continues to step 430 where the actuator is opened to the desired position plus an actuator specific buffer. In one illustrative embodiment, the actuator specific buffer is based on the amount of slack of the drive train of the actuator. In some illustrative embodiments, the actuator specific buffer is 1.5 volts. The method 400 then ends in a step 440 where the actuator is closed to the new desired position.

One skilled in the art will understand that the buffer employed can vary based on the type of actuator and the actual installation. The value (e.g., voltage) of the buffer can be determined during calibration. The method 400 represents compensating for hysteresis employing a final close operation (step 440). A similar compensation can be performed by ending in an open operation. For example, in step 430, the actuator could be opened to the new position with the addition of a negative buffer (e.g., −1.5 volts). As such, in step 440, the actuator would be opened to the new position.

Figure 5:
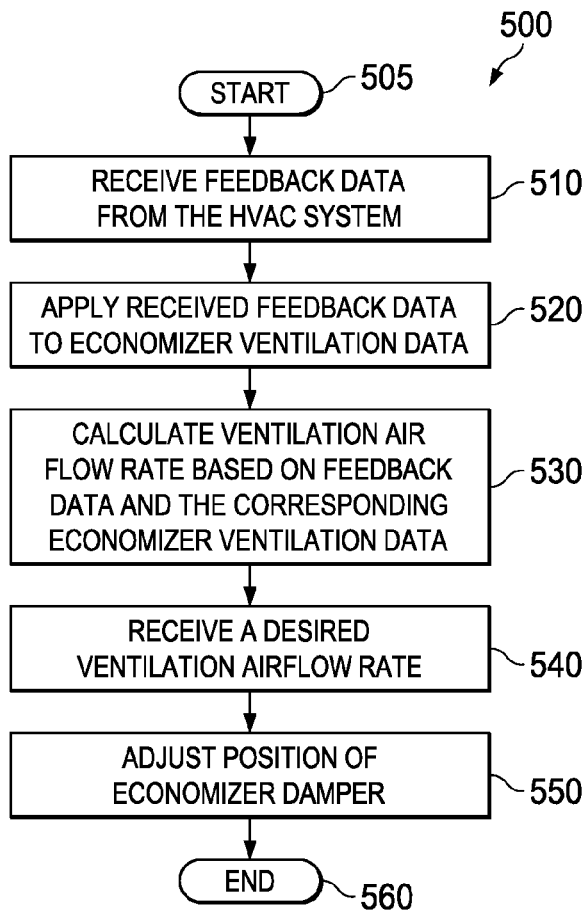

FIG. 5 illustrates a flow diagram of an illustrative method 500 of measuring and managing ventilation airflow of a HVAC system. The method 500 may be carried out under the direction of a computer program product. In one illustrative embodiment, a controller of an HVAC system is employed to carry out the method 500. The method 500 begins in a step 505.

In a step 510, feedback data is received from an HVAC system. In one illustrative embodiment, the feedback data corresponds to the pressure difference across an outdoor economizer damper and economizer damper position of the HVAC system. Additionally, the feedback data may include the supply airflow rate. The feedback data is typically real time data obtained during operation of the HVAC system.

The feedback data is applied to economizer ventilation data in a step 520. The feedback data applied may include the outdoor economizer damper pressure difference, the supply airflow rate and the economizer damper position. The economizer ventilation data represents ventilation airflow rates of the HVAC system and is based on measured data obtained before installation of the HVAC system.

In a step 530, an operating ventilation airflow rate is calculated based on the feedback data and the corresponding economizer ventilation data.

A desired ventilation airflow rate is received in a step 540. In a step 550, a position of the economizer is adjusted based on the economizer damper position and the desired ventilation airflow rate. In some illustrative embodiments, the adjustment is zero when the operating ventilation airflow rate is at or within a designated percentage of the desired ventilation airflow rate. In some illustrative embodiments, the desired airflow rate is entered by a user in the field. In other illustrative embodiments, the desired airflow rate is predetermined and established before or during installation. In these embodiments, the desired airflow rate can be changed after installation. The method 500 ends in a step 560.

The above-described methods may be embodied in or performed by various conventional digital data processors, microprocessors or computing devices, wherein these devices are programmed or store executable programs of sequences of software instructions to perform one or more of the steps of the methods, e.g., steps of the method of FIG. 5. The software instructions of such programs may be encoded in machine-executable form on conventional digital data storage media that is non-transitory, e.g., magnetic or optical disks, random-access memory (RAM), magnetic hard disks, flash memories, or read-only memory (ROM), to enable various types of digital data processors or computing devices to perform one, multiple or all of the steps of one or more of the above-described methods, e.g., one or more of the steps of the method of FIG. 5. Additionally, an apparatus, such as dedicated HVAC controller, may be designed to include the necessary circuitry to perform each step of the methods disclosed herein.

Figure 6:
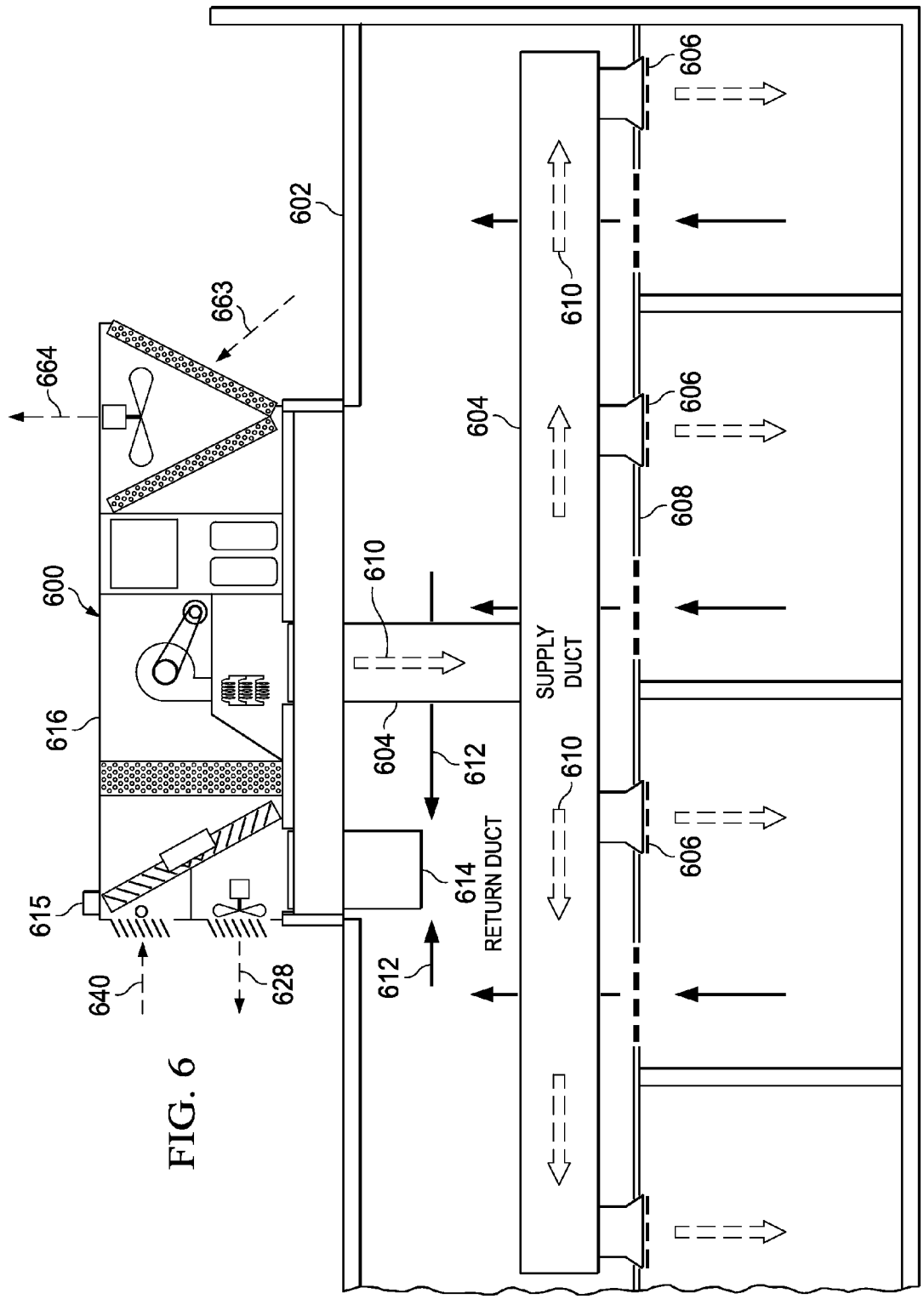
FIG. 6 is a schematic diagram in cross section of a rooftop HVAC unit.
Figure 7:
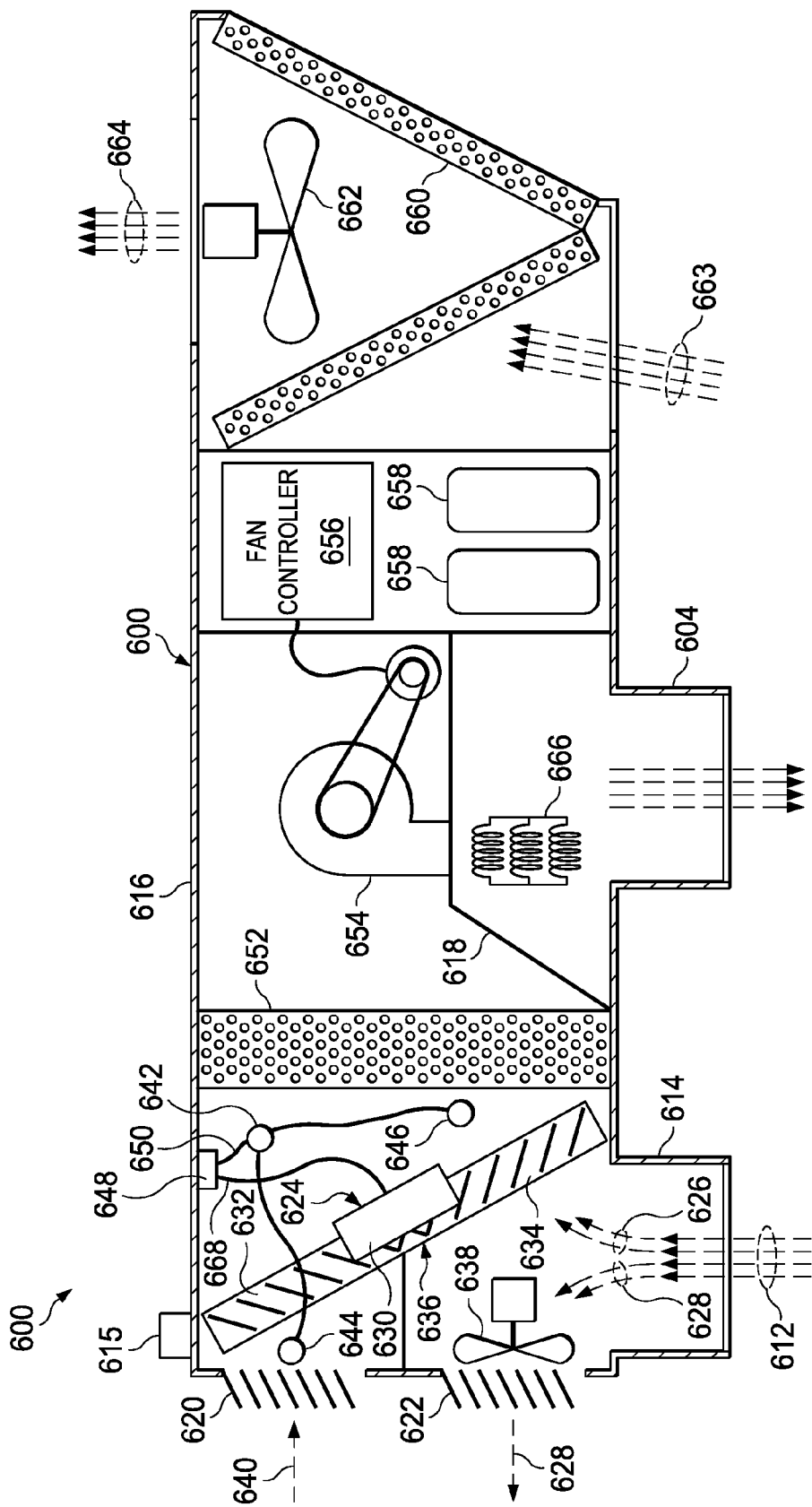
FIG. 7 is a detail of a portion of the schematic diagram of FIG. 6.

Referring now primarily to FIGS. 6 and 7, another illustrative embodiment of a heating, ventilating, and air conditioning or cooling (HVAC) System 600 is presented. The system 600 is analogous in many respects to system 100 in FIG. 1. The HVAC System 600 is a rooftop unit (RTU). While the illustrative embodiment of system 600 is discussed in the context of an RTU, the scope of the disclosure includes other HVAC applications that are not rooftop mounted. The system 600 is shown on roof 602. The system 600 supplies conditioned air through a supply duct system 604 to room vents 606, which are typically through a ceiling 608. In this way, supply air flow 610 is delivered to an interior of the building. As the air continues to flow, the return air 612 is delivered to a return duct 614 from where it will be conditioned and returned again or will exit the HVAC System 600.

The HVAC system 600 includes an enclosure or housing 616, which may include one or more partitions 618 in an interior portion. The enclosure 616 has a ventilation opening that is covered by ventilation vents 620 and an exhaust opening covered by a barometric relief damper 622, or exhaust vents.

The HVAC system 600 includes an economizer 624 that controls ventilation flowing through the ventilation vents 620 and the amount of return air 612 that is recycled as shown by airstream 626 or that is exhausted as shown by exhaust airflow 628. The economizer 624 includes an actuator 630 that is able to move a plurality of blades that make up an outdoor damper 632 and a plurality of blades that make up a return damper or indoor damper 634. The outdoor damper 632 and return damper 634 are part of a damper assembly 636 and may move in a coordinated fashion. The actuator 630 communicates with a controller 648.

An exhaust fan 638 may be used to push the exhaust airflow 628 through the barometric relief damper 622. As noted in connection with FIG. 1, the economizer 624 in economizer mode allows maximum flow of outdoor ventilation airflow 640 into the system 600 and primarily exhausts all of the return airflow 612 as exhaust 628. At other times, the economizer 624 may help to regulate the amount of ventilation introduced to meet indoor air quality standards or desired levels of fresh air.

One or more pressure sensors 642 are included for measuring pressure at different points or across certain elements. In this example, the pressure sensor 642 measures pressure across the outdoor damper 632. In other illustrative embodiments, additional pressure measurements may be made at various locations, for example, across the return damper 634. The pressure sensor 642 may have transducers 644 and 646 and may be coupled to the controller 648 by a cable 650 or wirelessly or other means. Air leaving the economizer 624 within the system 600 travels across a cooler or evaporator 652, and then with the assistance of a blower or fan 654 is delivered into the supply duct system 604. A fan controller 656 may be used to control the blower 654 and other components if desired. The fan controller 656 may be separate or the same as the controller 648.

The HVAC system 600 may include one or more compressors 658 to compress a working fluid used in conjunction with condensers 660 and condenser fans 662 to develop a cold working fluid delivered to the cooler 652 during cooling operations. Outdoor air 663 is pulled across the condenser coils 660 and exhausted at 664 to reject heat. Heating coils 666 are included within the partitioned portion to heat air from the blower 654 during heating operations.

A thermostat 615 is coupled to the controller and heating and cooling components. The thermostat 615 helps control the heating and cooling capacity of the HVAC system to maintain a user defined temperature in the zone. When in cooling mode, the thermostat cycles the compressor(s) 658 on and off, commonly referred to as duty cycling, to keep the zone temperature at the cooling setpoint. As the cooling load increases, the fraction of the time the compressor(s) 658 are on increases. At maximum cooling load, the compressors are on 100% of the time. At low load periods, the compressors can be running less than 20% of the time. When in heating mode, the thermostat 615 controls the heating coils 666 and again may interface with the controller 656 to control the fan 654.

The controller 648 is analogous to the controller 160 in FIG. 1. The controller 648 includes at least one memory and at least one processor associated with the at least one memory for carrying out numerous operations and functions. The controller 648 may be coupled to the actuator 630 such as by a cable 668 or other means. As previously noted, the controller 648 may be coupled by the cable 650 to one or more pressure sensors 642. As previously discussed, the correlation of airflow through the economizer 636 based on the position of the outdoor damper 632 and the pressure differential across the outdoor damper 632 allows for the desired ventilation flow 640 to be set and controlled by the controller 648.

The cooling coil 652, when the compressor is running, cools the air and dehumidifies the air. As relatively warm, humid air comes into contact with the coils, the coils cool off the air and dehumidify it. Meanwhile, water typically results on the coils. The water collects on the coils until saturated and then will enter the drain pan. If the compressor is turned off and air continues to flow over the coils, the air will tend to evaporate the water and will take on additional humidity. This can have a negative impact on the dehumidification capacity of the system. The systems described herein can help with this issue by turning off the blower or fan while the compressor is off and yet adequately ventilating the building.

While the control of outdoor air into the system has been described initially in terms of the economizer and actuator, it should be understood that any system for controlling the air introduction might be used. More generally, an outdoor air intake and an actuator may be used to adjust the outdoor air introduced into the system. Similarly, while a pressure differential across an outdoor damper or economizer along with a known relationship allows control of the air introduced, other techniques might be used to determine or estimate the air flow. Accordingly, in more general terms, an outdoor air measurement device may associated with the outdoor air intake for determining a quantity of outdoor air or the ventilation rate of air entering through the outdoor air intake. The controller is coupled to the outdoor air measurement device and the outdoor air intake and is operable to control the outdoor air intake to allow a prescribed amount of outdoor (outdoor airflow rate) to enter there through.

Figure 8:
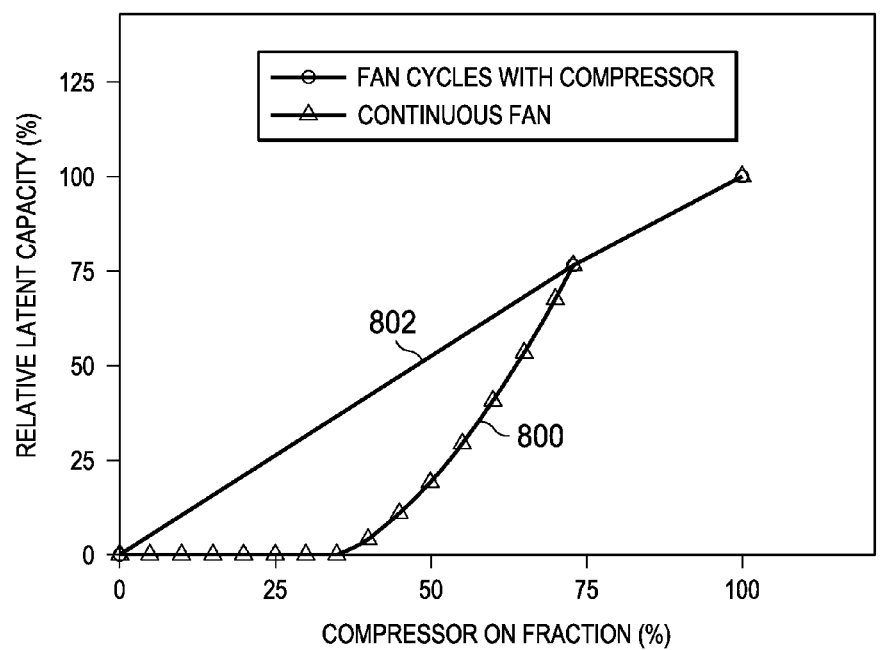
FIG. 8 is a schematic graph with latent capacity on the ordinate and compressor on fraction (%) on the abscissa and showing generally a curve for an HVAC system running with the fan on all the time and one using intermittent functioning.

In one illustrative embodiment, the blower or fan 654 is turned off while the compressor 658 is off and thereby eliminates a substantial amount of evaporation of water from the cooling element 652 that would otherwise occur and thereby offers improved dehumidification or latent capacity of the air. For example, with reference now primarily to FIG. 8, if the fan 654 (FIG. 7) is continuously run in an illustrative unit, the curve of latent capacity (%) versus compressor-on fraction (%) is qualitatively something like that shown by curve 800. If, however, the fan is cycled with the compressor, a curve more like 802 is produced.

These curves are presented to show the qualitative enhancement available by intermittently operating the fan and the compressor at the same time. This is not currently done with commercial buildings because in most instances the fan continues to run in order to supply the required amount of outdoor airflow 640 (FIG. 7) to meet indoor air quality standards (or required continuous outdoor airflow rate) for desired amounts of fresh air. In the present illustrative embodiment, to allow the compressor and fan to only run together and yet to ventilate as required, the ventilation is increased during the compressor-on cycle in order to compensate for the fan being off during other portions of a cycle. The ventilation can be readily controlled since the controller 648, according to the explanations previously given, can control the amount of ventilation 640 entering into the HVAC system 600.

In one illustrative embodiment, the system will first estimate a first duty cycle for forthcoming operations. The estimate may be for the next 60 minutes, or for some other interval. The duty cycle estimate may be estimated by averaging previous cycle durations, for example averaging the last three run times or some other number. The duty cycle may be estimated by having the system consider data from previous days or even previous years for that same time of year. The system may take some of the data just mentioned and further modify an initial estimated duty cycle based on forecasted weather. The forecasted weather may be received over an internet connection, wireless connection, or other means of supplying forecasted information to the controller 648 (FIG. 7).

The required continuous outdoor airflow rate for a first time interval (e.g., flow rate/hour) may be known; that is, the required continuous outdoor airflow rate that applicable standards require in order to have the indoor air quality is known. For example, the required outdoor airflow rate may be required by ASHRAE 62.1 The required continuous outdoor airflow rate may be entered into the system at the time of manufacturing, set up, or at another time. As used herein, "required continuous outdoor airflow" may also include a desired outdoor flow rate selected by the building operator.

The controller (e.g., 648 in FIG. 7) may include one or more processors associated with one or more memories for carrying out numerous functions. Analogous to that explained in connection with controller 160 in FIG. 1, the controller may include software, or a ventilation director, configured to determine a ventilation flow rate through the outdoor air intake, e.g., outdoor damper, based on the outdoor air measurement device. The pressure difference across or proximate the economizer and the known relationship may be used to determine the outdoor air flow. In addition, the controller may include software, e.g., an airflow director, that is configured to determine the desired outdoor airflow rate for the system to have the fan only operate when the compressor is operating and yet still keep the required continuous outdoor airflow rate. In such an embodiment, the airflow director communicates with the ventilation director to set the desired airflow rate.

The controller 648 calculates the quantity of ventilation (outdoor air) to be provided during the estimated duty cycle time in order to adequately ventilate the building during a time interval. This is the first desired flow rate. Moreover, the controller can monitor the total outside airflow that is introduced and determine any error that has occurred and compensate for the error on the next run cycle. If desired, a margin of safety may be included in as well in developing the estimated duty cycle. The actual ventilation may be estimated based on known relationships (e.g., like that shown in FIG. 9) or an airflow sensor may be added proximate the outdoor damper or ventilation vents to directly measure outdoor airflow. In another illustrative embodiment, air entering into the system 600 from other locations such as through the barometric relief damper 622 may also be considered in a calculation of total ventilation. After the first duty cycle or compressor run has been completed, the system may estimate the duty cycle again to update the estimate or maintain the initial estimate.

Figure 9:
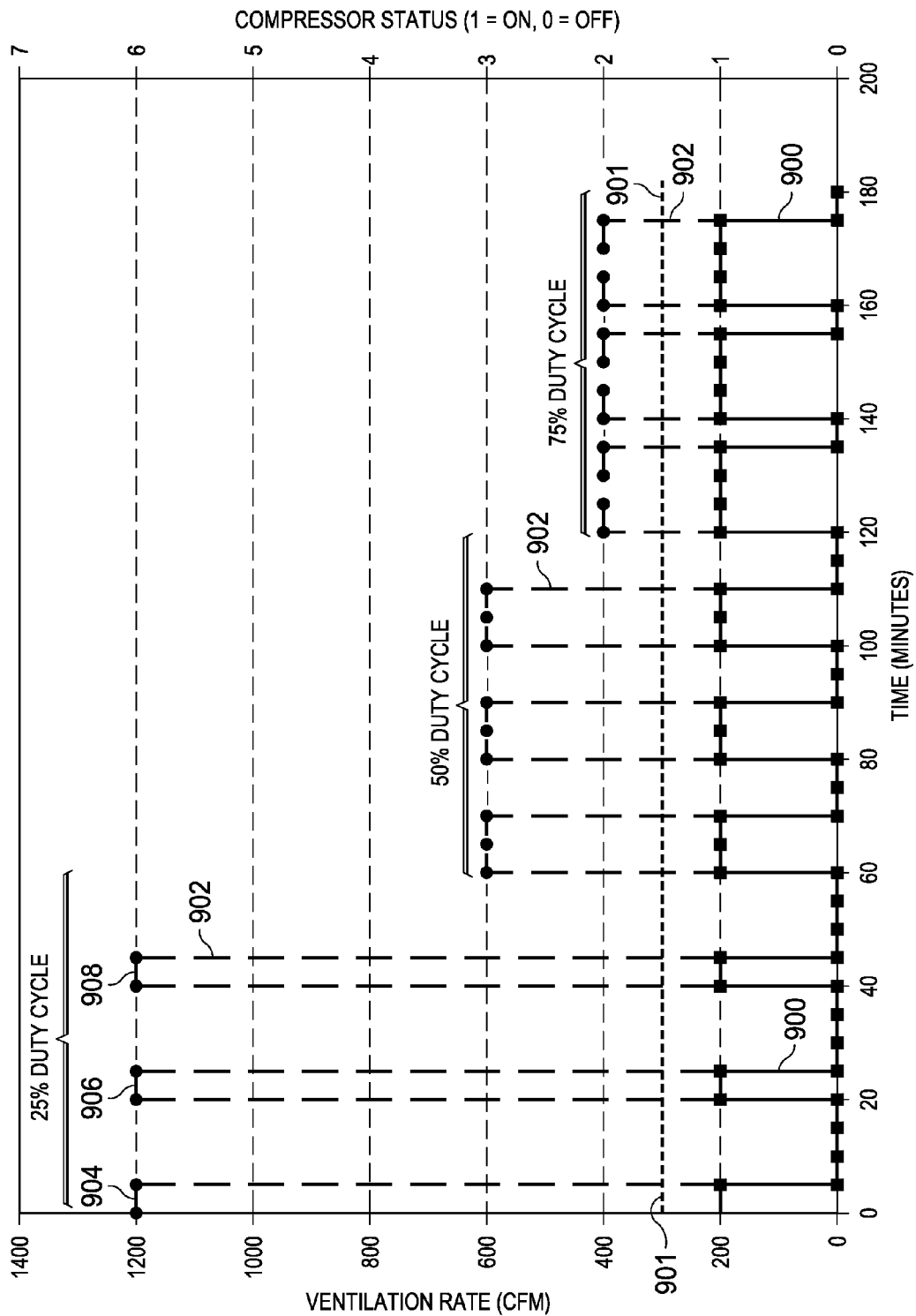
FIG. 9 is a schematic graph with ventilation rate and compressor status on the ordinates and elapsed time on the abscissa showing ventilation for one illustrative embodiment.

Referring now primarily to FIG. 9, an illustrative graph is presented only for the purpose of qualitatively presenting basic ideas. The ordinate scale on the left shows outdoor ventilation in cubic feet per minute (CFM). The ordinate on the right is the compressor status: 1=compressor on and 0=compressor off. The abscissa axis is elapsed time in minutes. Curve 900 represents the compressor on/off status. In the first 60 minutes the thermostat is cycling the compressor on 5 minutes and off 15 minutes or a 25% (i.e., 5/20) duty cycle. Since the compressor is only on 25% of the time, the controller (e.g., controller 160, 648) should ventilate at 4× the desired continuous ventilation rate 901 (or required continuous outdoor air flow rate) to provide the same amount of ventilation air. Curve 902 shows the ideal ventilation rate required to achieve the desired continuous ventilation rate. In this example the required continuous outdoor airflow rate (ventilation rate) is 300 CFM as shown by 901.

Thus, during the first 60 minutes, the controller chooses to ventilate at 1200 CFM as shown by segments 904, 906, and 908. In this way, the desired continuous flow rate is matched, i.e., (1200 CFM)*(15 minutes)=18,000 ft$^3$, which is equivalent to 300 CFM*60 minutes. So the same amount of ventilation is achieved. In the second hour (60-120 minutes), the compressor duty cycle is 50%, i.e., the compressor is on (or estimated to be on) half the time, and so the controller chooses to ventilate at 600 CFM, which is 2× the desired continuous value 901. Again the required continuous outdoor airflow rate is met: 30 min.*600 CFM=18,000 ft$^3$ (or CFM-minutes). In the last hour (120-180 minutes), the duty cycle is 75%, and so the controller chooses to ventilate at 400 CFM, which is 1.33× the required continuous outdoor air flow rate 901. This is how the system works with known or accurately predicted, stable cycles. For each hour, the total volume of ventilation air provided when the compressor is on is the same as would have been delivered had the system vented continuously at the required continuous outdoor air flow rate, or desired continuous ventilation rate 901.

In many applications, it is difficult to predict the actual compressor duty cycle with 100% accuracy, but the controller makes decisions based on the past duty cycle and adapts to errors as they arise. For example, during the first 60 minutes of an actual cycle, the compressor duty cycle is 25%, and so when the compressor turned on at time 60, the controller set ventilation rate to 4× the steady rate. If after 5 minutes of runtime, the controller expected the compressor to turn off, but the compressor stayed on, and the controller realized it would over ventilate. So the controller reduces the ventilation rate or will reduce on the next cycle. After 10 minutes of runtime, the compressor shuts off. At this point, the system over ventilated by 3000 CFM minutes. At 80 minutes when the compressor turns on again, the control determines that the new duty cycle is 50% and that the ventilation rate when compressor is on should be 600 CFM. Since the system is ahead 3000 CFM-minutes, the controller chooses to ventilate at 300 CFM (300 CFM less than the standard rate to compensate for the over ventilation). After 10 minutes the compressor turns off. At 100 minutes, the controller again concludes that the duty cycle is 50% and sets the base ventilation rate to 600 CFM. Since the excess ventilation was completely accounted for in the previous on time, the controller just ventilates at 600 CFM. This is one illustrative example of how the controller can adjust the ventilation based on expected duty cycle and prior error rates.

Figure 10:
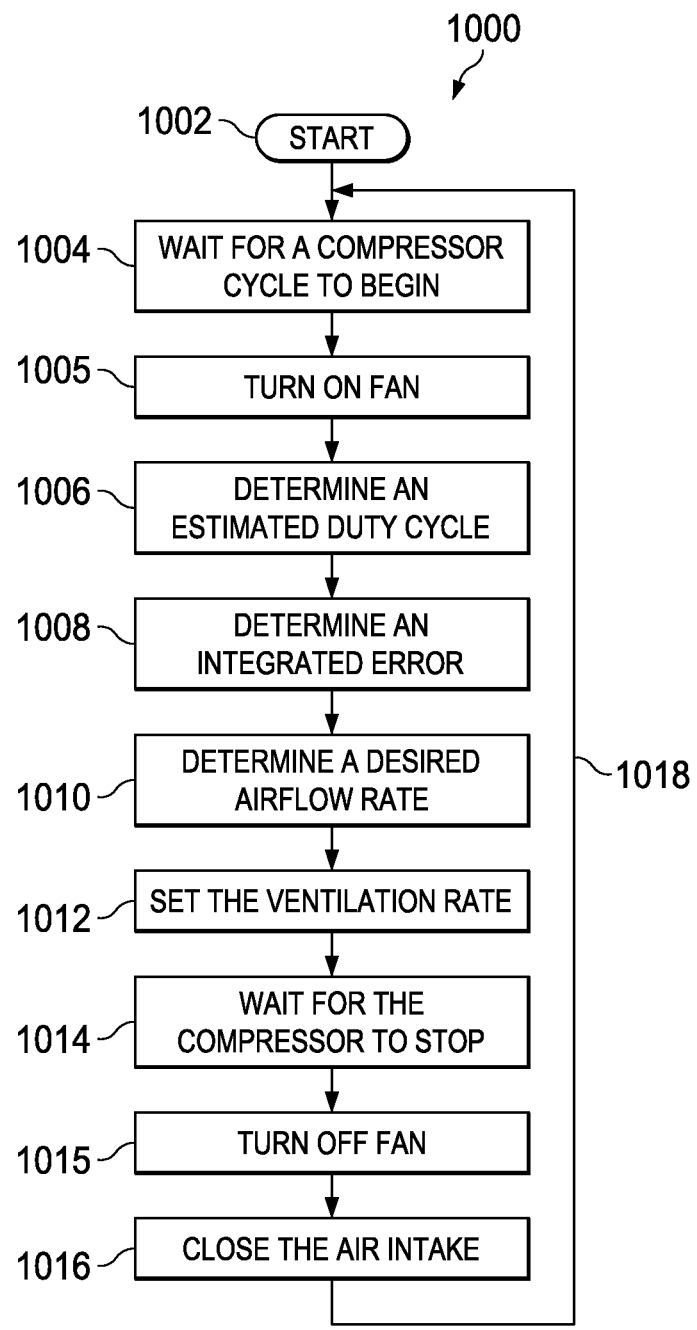
FIG. 10 is a schematic flowchart for one illustrative method of ventilating a building.

It will be readily appreciated by one skilled in the art based on the description herein that numerous steps may be taken to carryout different embodiments of the invention, in one illustrative embodiment shown in FIG. 10, a method 1000 for ventilating a building is presented. The method 1000 begins at 1002 and involves waiting for a compressor cycle to begin at step 1004. Step 1004 involves waiting on the thermostat 615 (FIG. 6) to initiate a compressor-on interval. At the same time or approximately the same time, the fan or blower is turned on as shown as step 1005. As previously noted, benefits are gained by having the fan and blower operate together and then turning them off together.

Step 1006 involves determining an estimated duty cycle for the beginning time interval. This may be done in many ways. Step 1006 is typically based on the duty cycle of the previous time interval. For example, if the last hour involved a 25% percent duty cycle, that same duty cycle may be assumed. Alternatively, the duty cycle may be modified or determined by considering historical data (cycle for the same time the day before or the year before or some other time or averaging duty cycles) and any other factors, such as a weather factor.

Next at step 1008, there is an optional step of determining the integrative error. This step 1008 involves determining if the previous time interval involved over ventilating or under ventilating and by how much. In this way the error may be considered in the desired airflow rate to meet or exceed the required continuous outdoor airflow rate, or required ventilation rate.

Step 1010 involves considering the estimated duty cycle and other optional information, e.g., error or weather, to arrive at the desired ventilation rate or desired outdoor airflow rate through the air intake. Step 1012 involves the controller, which has determined the desired outdoor airflow rate, telling the outdoor intake how to move in order to achieve the desired outdoor airflow rate. In other words, the desired ventilation is set for the current compressor-on cycle.

Step 1014 involves waiting on the current compressor-on cycle to end and at the same time or approximately the same time turning of the blower/fan at step 1015. Then, at step 1016, the air intake is closed while waiting on the next compressor on cycle to start as suggested by 1018.

In addition to the embodiments described above, many examples of specific combinations are within the scope of the disclosure, some of which are detailed below.

EXAMPLE 1

A method for ventilating a building comprising:
providing a heating, ventilating and air conditioning system comprising;
  an outdoor air intake and an actuator to adjust outdoor air introduced there through;
  an outdoor air measurement device associated with the outdoor air intake for determining a quantity of outdoor entering through the outdoor air intake;
  a compressor for cooling air;
  and a controller, the controller coupled to the outdoor air measurement device and the outdoor air intake and configured to control the outdoor air intake to allow a prescribed amount of outdoor air to enter there through;
determining a first desired airflow rate through the outdoor air intake based on a first estimated duty cycle of the compressor and a required continuous outdoor air flow rate;
adjusting the outdoor air intake using the controller to set the first desired airflow rate through the outdoor air intake; and
running the compressor and fan for a first time interval.

EXAMPLE 2

The method of example 1, wherein the
outdoor air intake and an actuator comprises economizer having an outdoor damper and an actuator to move blades thereof; and
wherein the outdoor air measurement device comprises a pressure sensor configured to determine a pressure differential across the outdoor damper.

EXAMPLE 3

The method of example 1, further comprising:
determining an integrative error for total outside air flow during the first time interval;
determining a second desired flow rate through the outdoor damper based on a duty cycle of the preceding time interval and the required continuous outdoor air flow rate and the integrative error;
adjusting the outdoor air intake using the controller to obtain the second desired airflow rate through the outdoor air intake; and
running the compressor and fan for a second time interval.

EXAMPLE 4

The method of example 1, wherein the step of determining a first desired airflow rate through the air intake based on an estimated duty cycle of the compressor and a required continuous outdoor air flow rate comprises: determining the first desired airflow rate so that over a 60 minute interval, with the first estimated duty cycle set, an average flow rate will substantially equal the required continuous outdoor air flow rate.

EXAMPLE 5

The method of example 1, wherein the step of determining a first desired airflow rate through the outdoor air intake comprises: determining the first desired airflow rate so that over a 60 minute interval, with the first estimated duty cycle set, an average flow rate will substantially equal the required continuous outdoor air flow rate plus a degradation allowance.

EXAMPLE 6

The method of example 1, wherein the step of determining a first desired airflow rate through the outdoor air intake comprises:
averaging duty cycle durations for immediately preceding compressor runs to arrive at the first estimated duty cycle for an approaching cycle; and
determining the necessary first desired airflow rate required such that the estimated duty cycle multiplied by the first desired airflow rate is greater than or equal to the required continuous outdoor air flow rate for an established time interval.

EXAMPLE 7

The method of example 1, wherein the step of determining a first desired airflow rate through the outdoor air intake comprises:
noting an approximate operation time of the day; and
averaging duty cycle durations for compressor runs at approximately the operation time on one or more preceding days to arrive at the first estimated duty cycle for an approaching cycle.

EXAMPLE 8

The method of example 1, wherein the step of determining a first desired airflow rate through the outdoor air intake comprises:
  noting an approximate operation time of the day;
  averaging duty cycle durations for compressor runs at approximately the operation time on one or more preceding days to arrive at the estimated duty cycle for an approaching cycle; and
  multiplying the estimated duty cycle by a weather factor based on forecasts.

EXAMPLE 9

A system for ventilating a building, the system comprising:
  an economizer having an outdoor damper and an actuator to move blades thereof;
  a pressure sensor configured to determine a pressure difference across the outdoor damper;
  a compressor for cooling air; and
  a controller in communication with the economizer and pressure sensor, the controller comprising one or processors and one or more memories associated with the one or more processors, and wherein the one or more processors and one or more memories are configured to:
    receive feedback data including the pressure difference and an economizer damper position,
    determine a first desired airflow rate through the outdoor damper based on a first estimated duty cycle of the compressor and a required continuous outdoor air flow rate based on a first time interval,
    communicate with the ventilation director to adjust the outdoor damper to obtain the first desired airflow rate through the outdoor damper, and
    activate the compressor and fan for a second time interval, wherein the second time interval is less than the first time interval.

EXAMPLE 10

The system of example 9, wherein the airflow director is further configured to:
  determine an integrative error for total outside air flow during the second time interval;
  determine a second desired flow rate through the outdoor damper based on a second estimated duty cycle of the compressor and a required continuous outdoor air flow rate and the integrative error;
  communicate with the airflow director to adjust the outdoor damper using the controller to obtain the second desired airflow rate through the outdoor damper; and
  activate the compressor and fan for a third time interval, wherein the third time interval is less than the first time interval.

EXAMPLE 11

The system of example 9, wherein the controller is configured to determine the first desired airflow rate through the outdoor damper by one or more steps that comprise:
  determining the first desired airflow such that, with the first estimated duty cycle, an average flow rate for the first time interval will substantially equal the required continuous outdoor air flow rate.

EXAMPLE 12

The system of example 9, wherein the controller is configured to determine the first desired airflow rate through the outdoor damper by one or more steps that comprise:
  determining the first desired airflow such that, with the first estimated duty cycle, an average flow rate for the second time interval will substantially equal the required continuous outdoor air flow rate plus a degradation allowance.

EXAMPLE 13

The system of example 9, wherein the controller is configured to determine the first desired airflow rate through the outdoor damper by steps that comprise:
  averaging duty cycle durations for immediately preceding compressor runs to arrive at the first estimated duty cycle for an approaching cycle; and
  determining the necessary first desired airflow rate required such that the estimated duty cycle multiplied by the first desired airflow rate is greater than or equal to the required continuous outdoor air flow rate.

EXAMPLE 14

The system of example 13, wherein the step of averaging the duty cycle durations comprises averaging three preceding duty cycle durations.

EXAMPLE 15

The system of example 9, wherein the controller is configured to determine the first desired airflow rate through the outdoor damper by one or more steps that comprise:
  noting an approximate operation time of day; and
  averaging duty cycle durations for compressor runs at approximately the operation time on one or more preceding days to arrive at the first estimated duty cycle for an approaching cycle.

EXAMPLE 16

The system of example 9, wherein the controller is configured to determine the first desired airflow rate through the outdoor damper by one or more steps that comprise:
  noting an approximate operation time;
  averaging duty cycle durations for compressor runs at approximately the operation time on one or more preceding days to arrive at the first estimated duty cycle for an approaching cycle; and
  adjusting the estimated duty cycle by a weather factor based on forecasts.

EXAMPLE 17

A method of manufacturing a rooftop heating, ventilation, and air conditioning system, the method comprising:
  providing a housing;
  coupling an outdoor air intake and actuator to the housing;
  associating an outdoor air measurement device with the outdoor air intake for determining a quantity of outdoor entering through the outdoor air intake;
  coupling a compressor and fan to the housing for cooling air; and
  coupling a controller to the actuator and outdoor air measurement device, the controller operable to control the outdoor air intake to allow a set ventilation flow rate to enter there through, the controller comprising:
an interface configured to receive feedback data corresponding to the estimated quantity of outdoor air entering through the outdoor air intake and the air intake position, and
a ventilation director configured to set the ventilation airflow rate through the air intake based on the air intake position and air intake ventilation data; and
an airflow director configured to:
determine a previous duty cycle,
determine a desired outdoor airflow rate for a beginning time interval in order to meet a required continuous outdoor airflow rate, and
communicate with the ventilation director to adjust the outdoor air intake to obtain the first desired airflow rate through the outdoor air intake.

EXAMPLE 18

The method of example 17, wherein the airflow director is further configured to:
determine an integrative error for total outside air flow for a previous time interval;
determine a second desired flow rate through the outdoor air intake based on a second estimated duty cycle of the compressor and the required continuous outdoor air flow rate and the integrative error;
communicate with the airflow director to adjust the outdoor air intake using the controller to obtain the second desired airflow rate through the outdoor air intake; and
activate the compressor and fan for another time interval.

EXAMPLE 19

The method of example 17, wherein the controller is configured to determine the first desired airflow rate through the outdoor air intake by one or more steps that comprise: determining the first desired airflow such that, with the first estimated duty cycle, an average flow rate for the first time interval will substantially equal the required continuous outdoor air flow rate.

EXAMPLE 20

The method of example 17, wherein the controller is configured to determine the first desired airflow rate through the outdoor damper by one or more steps that comprise: determining the first desired airflow such that with the estimated duty cycle an average flow rate for the first time interval will substantially equal the required continuous outdoor air flow rate plus a degradation allowance.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:
1. A method for ventilating a building comprising:
providing a heating, ventilating and air conditioning system comprising:
an outdoor air intake and an actuator to adjust outdoor air introduced there through,
an outdoor air measurement device associated with the outdoor air intake for determining a quantity of outdoor air entering through the outdoor air intake,
a compressor for cooling air, and
a controller, the controller coupled to the outdoor air measurement device and the outdoor air intake and configured to control the outdoor air intake to allow a prescribed amount of outdoor air to enter there through;
estimating a first duty cycle of the compressor to arrive at a first estimated duty cycle of the compressor;
determining a first desired airflow rate through the outdoor air intake based on the first estimated duty cycle of the compressor and a required continuous outdoor air flow rate;
adjusting the outdoor air intake using the controller to set the first desired airflow rate through the outdoor air intake; and
running the compressor and a fan for a first time interval.
2. The method of claim 1, wherein the
the outdoor air intake and an actuator comprises economizer having an outdoor damper and an actuator to move blades thereof; and
wherein the outdoor air measurement device comprises a pressure sensor configured to determine a pressure differential across the outdoor damper.
3. The method of claim 1, further comprising:
determining an integrative error for total outside air flow during the first time interval;
determining a second desired flow rate through the outdoor damper based on a duty cycle of the preceding time interval and the required continuous outdoor air flow rate and the integrative error;
adjusting the outdoor air intake using the controller to obtain the second desired airflow rate through the outdoor air intake; and
running the compressor and fan for a second time interval.
4. The method of claim 1, wherein the step of determining a first desired airflow rate through the air intake based on an estimated duty cycle of the compressor and a required continuous outdoor air flow rate comprises:
determining the first desired airflow rate so that over a 60 minute interval, with the first estimated duty cycle set, an average flow rate will substantially equal the required continuous outdoor air flow rate.
5. The method of claim 1, wherein the step of determining a first desired airflow rate through the outdoor air intake comprises:
determining the first desired airflow rate so that over a 60 minute interval, with the first estimated duty cycle set, an average flow rate will substantially equal the required continuous outdoor air flow rate plus a degradation allowance.
6. The method of claim 1, wherein the step of determining a first desired airflow rate through the outdoor air intake comprises:
averaging duty cycle durations for immediately preceding compressor runs to arrive at the first estimated duty cycle for an approaching cycle; and
determining the necessary first desired airflow rate required such that the estimated duty cycle multiplied by the first desired airflow rate is greater than or equal to the required continuous outdoor air flow rate for an established time interval.
7. The method of claim 1, wherein the step of determining a first desired airflow rate through the outdoor air intake comprises:

noting an approximate operation time of the day; and
averaging duty cycle durations for compressor runs at approximately the operation time on one or more preceding days to arrive at the first estimated duty cycle for an approaching cycle.

8. The method of claim 1, wherein the step of determining a first desired airflow rate through the outdoor air intake comprises:
noting an approximate operation time of the day;
averaging duty cycle durations for compressor runs at approximately the operation time on one or more preceding days to arrive at the estimated duty cycle for an approaching cycle; and
multiplying the estimated duty cycle by a weather factor based on forecasts.

9. A method of manufacturing a rooftop heating, ventilation, and air conditioning system, the method comprising:
providing a housing;
coupling an outdoor air intake and actuator to the housing;
associating an outdoor air measurement device with the outdoor air intake for determining a quantity of outdoor entering through the outdoor air intake;
coupling a compressor and fan to the housing for cooling air;
configuring the compressor and fan to operate to operate simultaneously; and
coupling a controller to the actuator and outdoor air measurement device, the controller operable to control the outdoor air intake to allow a set ventilation flow rate to enter there through, the controller comprising:
an interface configured to receive feedback data corresponding to an estimated quantity of outdoor air entering through the outdoor air intake and the air intake position,
a ventilation director configured to set the ventilation airflow rate through the air intake based on the air intake position and air intake ventilation data, and
an airflow director configured to:
determine a first estimated duty cycle,
determine a desired outdoor airflow rate for a beginning time interval based on the first estimated duty cycle in order to meet a required continuous outdoor airflow rate, and
communicate with the ventilation director to adjust the outdoor air intake to obtain the desired outdoor airflow rate through the outdoor air intake.

10. The method of claim 9, wherein the airflow director is further configured to:
determine an integrative error for total outside air flow for a previous time interval;
determine a second desired flow rate through the outdoor air intake based on a second estimated duty cycle of the compressor, the required continuous outdoor air flow rate, and the integrative error;
communicate with the airflow director to adjust the outdoor air intake using the controller to obtain the second desired airflow rate through the outdoor air intake; and
activate the compressor and fan for another time interval.

11. The method of claim 9, wherein the controller is configured to determine the first desired airflow rate through the outdoor damper by one or more steps that comprise:
determining the first desired airflow such that with the estimated duty cycle an average flow rate for the first time interval will substantially equal the required continuous outdoor air flow rate plus a degradation allowance.

* * * * *